US008061121B2

(12) United States Patent
Haugen

(10) Patent No.: US 8,061,121 B2
(45) Date of Patent: Nov. 22, 2011

(54) FLEX FUEL INTERNAL COMBUSTION ENGINE SYSTEM

(75) Inventor: David James Haugen, Ann Arbor, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 466 days.

(21) Appl. No.: 12/291,076

(22) Filed: Nov. 6, 2008

(65) Prior Publication Data

US 2009/0114196 A1 May 7, 2009

Related U.S. Application Data

(60) Provisional application No. 61/002,099, filed on Nov. 6, 2007.

(51) Int. Cl.
*F01N 3/00* (2006.01)

(52) U.S. Cl. ............... 60/285; 60/274; 60/295; 60/299; 123/575; 123/672

(58) Field of Classification Search ................ 60/274, 60/276, 285, 295, 303, 299; 123/431, 472, 123/478, 479, 525, 672, 673, 575
See application file for complete search history.

(56) References Cited

U.S. PATENT DOCUMENTS

| 5,473,887 | A | * | 12/1995 | Takeshima et al. | ............. 60/276 |
| 6,397,583 | B1 | * | 6/2002 | Davey et al. | ................... 60/277 |
| 7,305,939 | B2 | * | 12/2007 | Carlson | ................... 123/27 GE |
| 7,349,790 | B2 | * | 3/2008 | Sremac et al. | ............... 701/104 |
| 7,404,397 | B2 | * | 7/2008 | Dobeck | ......................... 123/672 |
| 2009/0107113 | A1 | * | 4/2009 | Thanasiu et al. | ............... 60/276 |

* cited by examiner

*Primary Examiner* — Tu Nguyen
(74) *Attorney, Agent, or Firm* — David H. Read

(57) ABSTRACT

A flex fuel internal combustion engine system includes means for sensing ethanol concentration of the fuel. If the ethanol concentration is determined to be above a given threshold, engine operation is adjusted for lean combustion of the fuel. An aftertreatment system is provided to remove harmful emissions from the exhaust.

5 Claims, 3 Drawing Sheets

FLEX FUEL INTERNAL COMBUSTION ENGINE SYSTEM

CROSS-REFERENCE TO RELATED APPLICATIONS

This application claims priority from U.S. Provisional Application 61/002,099, "Flex Fuel Internal Combustion Engine System," filed Nov. 6, 2007.

BACKGROUND

Vehicle Range Limitations Involved in Use of Alcohol Fuels in FFVs

Although there can be environmental and other benefits for vehicle use of high blend alcohol fuels (such as E85), consumer acceptance remains a barrier to widespread use of the fuel, particularly in the United States. One commonly stated factor holding back widespread consumer demand of E85 is the lack of vehicle range per tank of fuel when comparing E85 with traditional gasoline blends (e.g. E0\E10). This factor is a two-fold consequence of the lower energy density of pump grade E85 as compared to E0 (about 80% of the energy per gallon) and a typically lower engine brake efficiency in running on E85 in a flex fuel vehicle (FFV). The combination of these two effects results in a reduction in vehicle range of 20%-30% for a typical flex fuel vehicle operating on E85. With this disparity, E85 in the U.S. generally offers a financial disincentive in terms of fuel cost per mile traveled.

Thus, there exists a need for a flex fuel vehicle that offers similar miles traveled per gallon of fuel for both regular gasoline and E85 (or at least close enough to commercially justify for the consumer more widespread use of E85 fuel).

Difficulties in Treating Emissions in Lean Burn Engine Systems

It is known in the art that lean combustion of gasoline and other fuels can increase the efficiency of an internal combustion engine system by 15% or more. As a result of these efficiency improvements, lean combustion gasoline engines have found commercial success in many parts of the world. Combined cycle engines, which operate lean at low loads, and at stoichiometry at higher loads, are also known (see, e.g., commonly assigned U.S. Pat. No. 5,549,087 to Gray and Hellman). However, gasoline engines that operate lean have not been commercialized in the United States due to difficulties in meeting U.S. emission requirements. In particular, lean combustion is not compatible with conventional three-way catalysts typically used for gasoline engines. In addition, other aftertreatment technologies that may be used with lean combustion engines are subject to sulfur poisoning. For example, the sulfur tolerance limit of SCR and LNT/LNC (i.e. Lean NOx trap/Lean NOx catalyst) systems are approximately 15 ppm to 25 ppm. In contrast, sulfur levels in U.S. gasoline are typically around 30 ppm, but can range up to 80 ppm, thus requiring an aftertreatment system that can tolerate a high proportion of usage of 80 ppm sulfur without deactivating or degrading the aftertreatment system.

SUMMARY OF THE INVENTION

A flex fuel internal combustion engine system is conceived to more efficiently combust E85 fuel in order to offer more similar miles traveled per gallon of E85 fuel as for regular gasoline.

A real-time ethanol sensor commercially available from Delphi (and believed to be described and disclosed in various patents assigned to Delphi, such as U.S. Pat. No. 7,095,501) is provided in the vehicle to quickly and accurately determine the ethanol concentration in the fuel tank. When the ethanol concentration is sufficiently high (e.g., high enough to ensure that the sulfur content of the fuel is less than the sulfur tolerance limit of the SCR or LNT/LNC system used), the engine operates in lean combustion mode. At other times, the engine operates conventionally at stoichiometry.

DETAILED DESCRIPTION OF THE INVENTION

Figure 1:
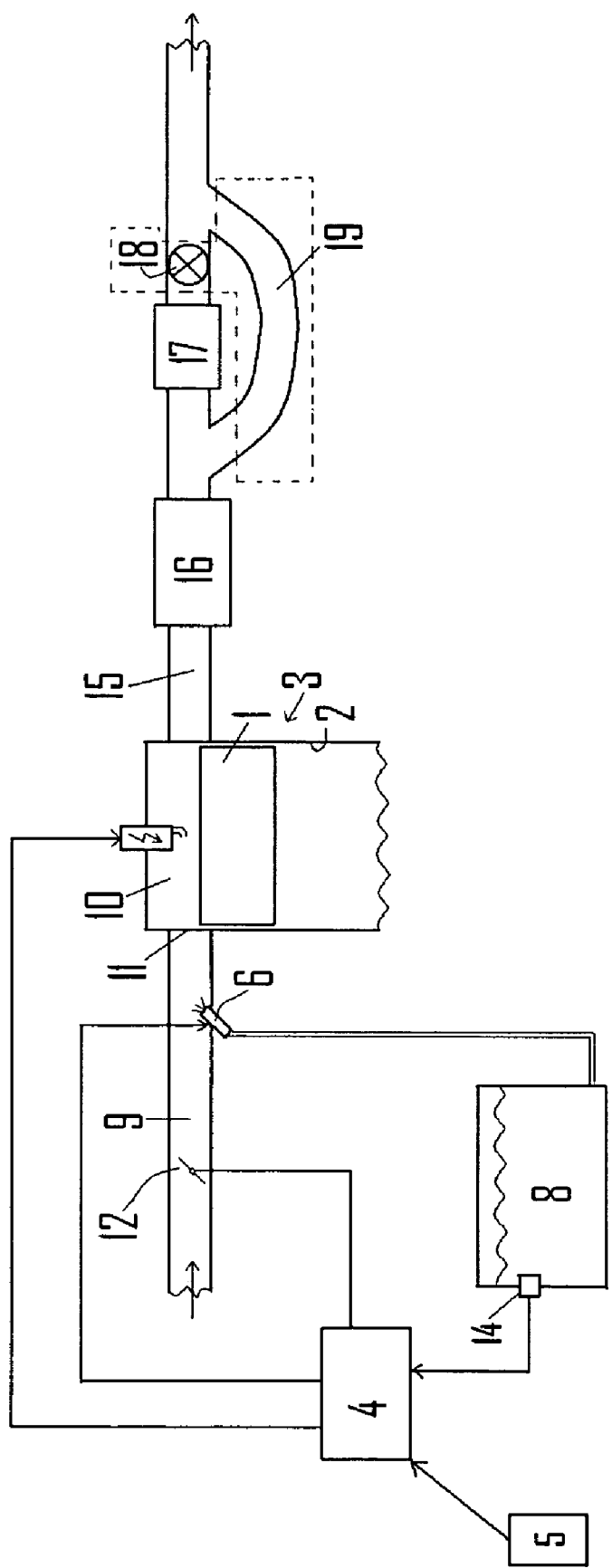
FIG. 1 is a schematic view of a combustion system of the present invention.

FIG. 1 shows a block diagram of a combustion system with engine control for a cylinder in a reciprocating piston engine, such as (but not limited to) a conventional flex fuel (gasoline/E85) internal combustion engine system for a motor vehicle. The engine structure itself, and flex fuel internal combustion engine systems in general, are well-known in the art, and thus will not be fully redescribed here.

Referring to FIG. 1, piston 1 reciprocates within cylinder 2 of internal combustion engine 3 in conventional fashion. Engine controller 4 receives various conventional inputs for operation (e.g., engine rpm, accelerator pedal position, etc), which are generically abbreviated on FIG. 1 as input(s) 5. Fuel injection device 6 is fluidly connected via fuel line 7 to fuel tank 8. Fuel and air enter combustion chamber 10 through port 11 for combustion. While fuel injection device 6 is shown in FIG. 1 as injecting fuel into air intake pipe 9, the fuel injection device could instead, or in addition, be configured to provide direct fuel injection into the cylinder combustion chamber, if desired. Engine controller 4 transmits signals to control fuel feed from injection device 6 and air-flow through butterfly valve 12 in the air intake pipe (or through a different air intake valve conventional in the art). Ethanol sensor 14 determines the ethanol concentration of fuel in fuel tank 8. Exhaust from combustion chamber 10 exits the engine 3 through exhaust pipe 15, and passes through conventional three-way catalyst 16. The exhaust then passes through aftertreatment device 17, which could be either a urea SCR lean-NOx system or an LNT/LNC. An optional bypass line 19 and bypass valve 18 may be provided to avoid sulfur loading in aftertreatment device 17.

Urea SCR lean-NOx systems and LNT/LNC systems will collectively be referred to here as Lean NOx aftertreatment systems. Such Lean NOx aftertreatment systems are well-known in the art and do not need to be described in detail here.

Figure 3A:
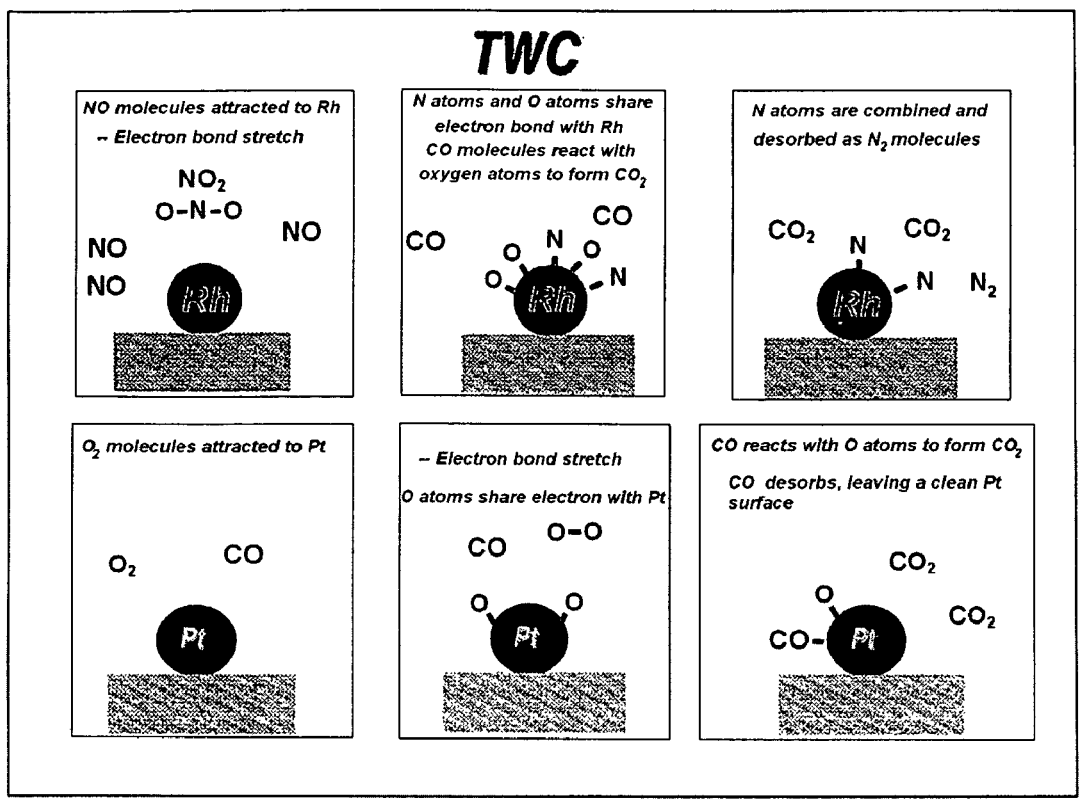
FIGS. 3A and 3B depict aftertreatment operation under one embodiment of the present invention.
Figure 3B:
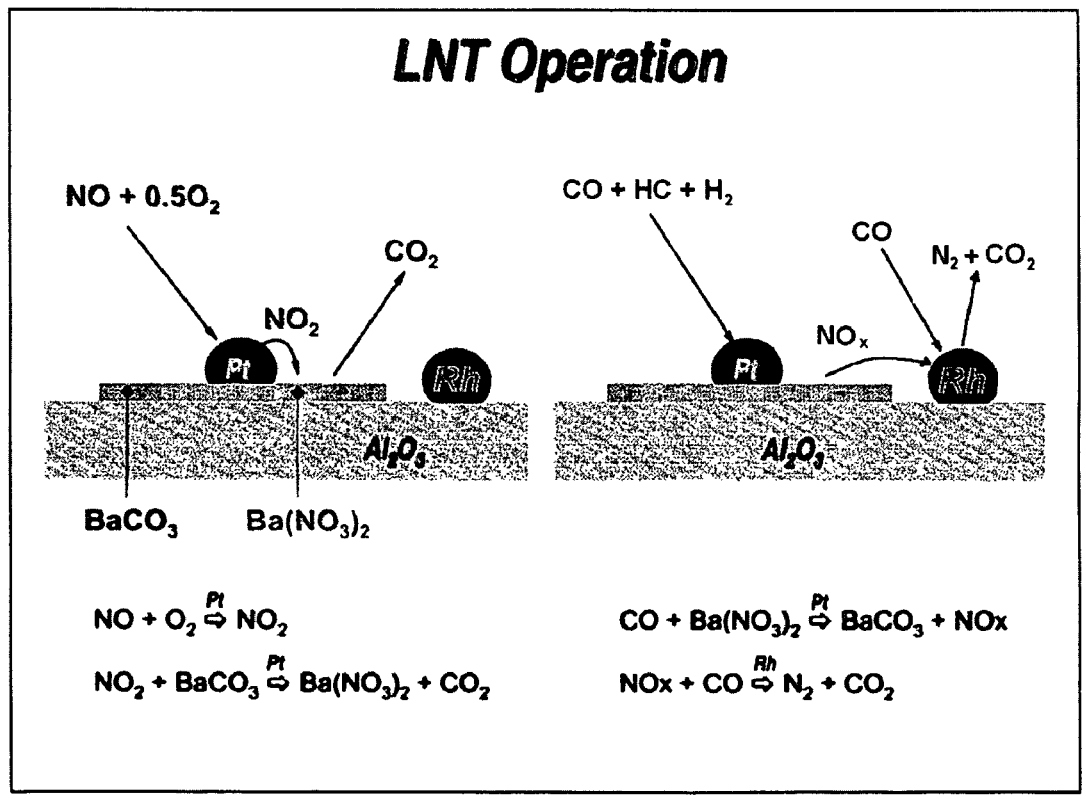

Alternatively to the arrangement shown in FIG. 1, three-way-catalyst 16 could potentially be combined with a LNT/LNC into a single aftertreatment device, with the LNT acting at times as a three-way catalyst. This is because, as shown in FIG. 3, by using the common Pt—Rh catalysts of LNTs and TWCs, there should be an opportunity to combine the functions of both the LNT and the three-way catalyst into a single unit that can operate in either mode. Using the likely higher catalyst loading of the two systems, and then allowing the LNT's Ba & $Al_2O_3$ substrate to reduce NO during lean, but switching across stoichiometric when sulfur levels are high to get the simpler TWC reduction process with just the Pt—Rh (and not relying on the Ba & Al$_2$O$_3$) should avoid degraded NOx reduction as the Ba is the element that is primarily deactivated from sulfur.

A method of the present invention will now be discussed. In this regard it should first be mentioned that, conventionally, the aftertreatment system set forth above would not work in the United States for a lean combustion gasoline engine because U.S. gasoline sulfur level is too high for such systems. However, the inventor has recognized that since ethanol has no sulfur, E85 (with the 15% gasoline at 80 ppm sulfur in US gasoline) has a worst-case sulfur concentration of 12 ppm, which is low enough to potentially enable use of lean combustion of the E85 fuel for higher efficiency and then use a lean-NOx system (SCR/LNT/LNC) as set forth in FIG. 1 for the exhaust clean up.

Figure 2:
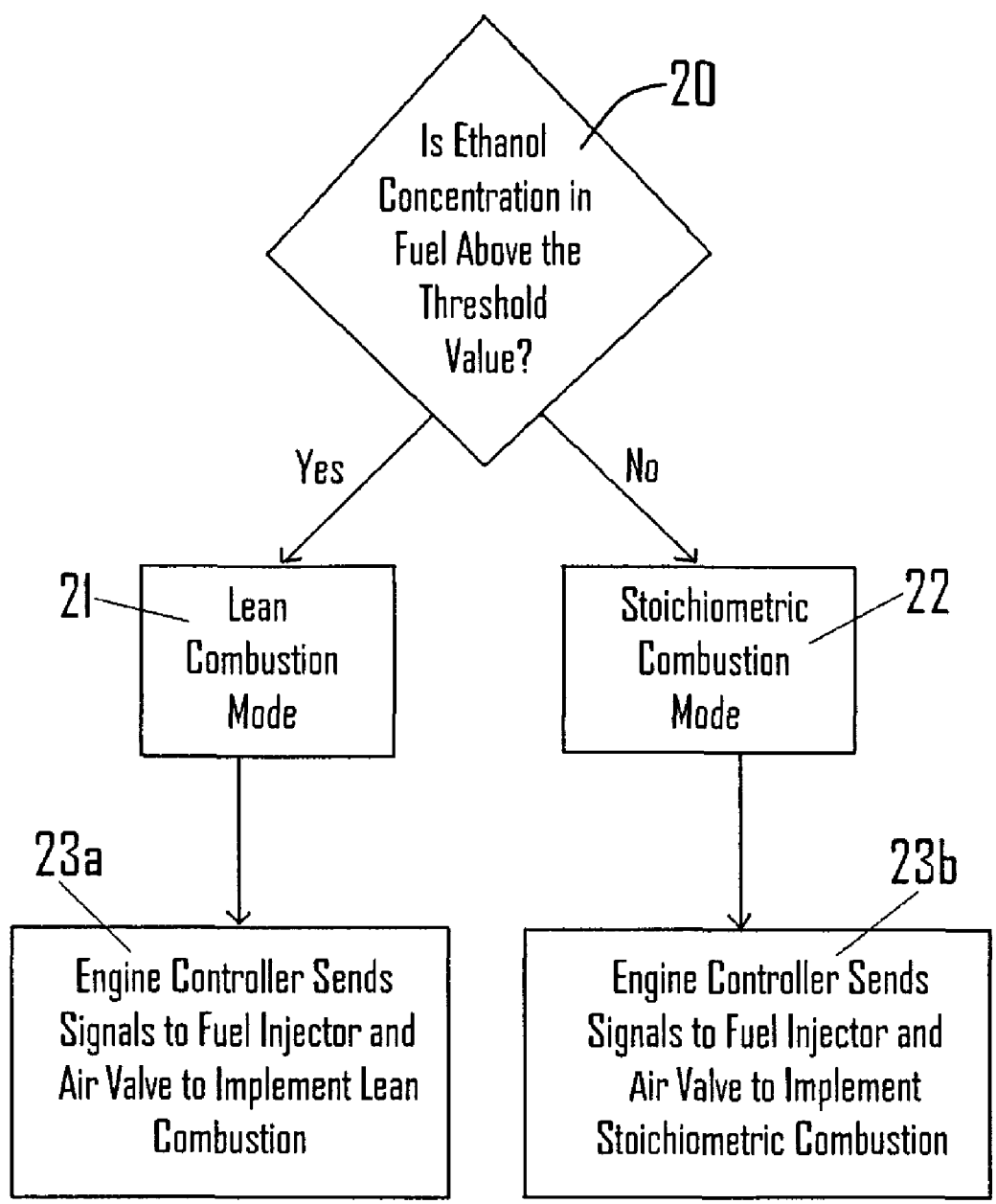
FIG. 2 is a flow chart describing one method of the present invention.

Therefore, as depicted in FIG. 2, under the method of the present invention, the ethanol concentration of the fuel is first determined by Delphi ethanol sensor 14 (Step 20). The Delphi ethanol sensor provides real-time sensing of ethanol concentration. The sensor is commercially available from Delphi (and believed to be described and disclosed in various patents assigned to Delphi, such as U.S. Pat. No. 7,095,501). Alternative means for sensing or determining ethanol concentration in the fuel (or whether such concentration passes a threshold value) could include, but are not limited to, the "Multifuel" software system (also available from Delphi), the "Software Fuel Sensor" (available from Magneti Marelli), or calculations made from exhaust oxygen concentrations, combustion characteristics, or other conditions or engine operating characteristics. Other alternatives for the preferred ethanol sensing means disclosed herein could include sensing or determining sulfur concentrations in the fuel, or the rate or extent of sulfur poisoning in the aftertreatment devices (see, e.g., U.S. Pat. No. 6,933,151 for means for determining sulfur poisoning in aftertreatment devices).

Whatever the means used for determining the ethanol concentration or sulfur concentration in the fuel, when the ethanol concentration is sufficiently high (e.g., high enough to ensure that the sulfur content of the fuel is less than the sulfur tolerance limit of the SCR or LNT/LNC system used), the engine operates in lean combustion mode (Step 21). Optionally, the system first enters into a desulfation mode to freshen the Lean NOx aftertreatment if necessary, if optional valve 18 and bypass line 19 are not used. If the ethanol concentration is not above the threshold value, the engine operates conventionally at stoichiometry (Step 22). This is implemented by engine controller 4 sending control signals to fuel injection device 6 and/or air valve 12 to adjust engine operation upon receiving signals from sensor 14 (or an alternative sensing or determining means) of the ethanol concentration (or sulfur concentration) crossing the given thresholds (Steps 23a and 23b). Sample thresholds would be a 70% ethanol concentration, or a 15 ppm sulfur level. The particular threshold chosen can vary, depending on the sulfur tolerances of the aftertreatment devices and the maximum possible sulfur concentration in the gasoline fraction of the fuel.

Some downsizing of a lean-NOx system over conventional systems used in Europe could also be achieved with occasional stoichiometric operation (for cheap exhaust clean-up) while most of the time operating lean for fuel efficiency.

It is believed that lean combustion of E85 similar to conventional gasoline direct injection combustion technologies should improve fuel economy in the use of E85 by more than 15% in real world driving, and in the 8%-13% range over the city-highway fuel economy test, which would make use of E85 a more commercially viable proposition for the vehicle buyer.

The invention herein is limited solely by the claims.

I claim:

1. A method of operating a flex fuel combustion system, comprising:
    determining the ethanol concentration in the fuel for the combustion system;
    adjusting fuel and air intake into the combustion system in order to maintain stoichiometry if the ethanol concentration is determined to be less than a threshold value;
    adjusting fuel and air intake into the combustion system to provide lean combustion at higher efficiency if the ethanol concentration is determined to be above the threshold value.

2. The method of claim 1, wherein the threshold value is 70%.

3. A flex-fuel combustion and aftertreatment system, comprising:
    an engine;
    a fuel tank configured to hold a fuel comprising gasoline, ethanol, or a mixture thereof, for combustion in the engine;
    a fuel injector fluidly connected to the fuel tank, configured to provide the fuel for combustion in the engine;
    means for determining the ethanol concentration of the fuel;
    means for controlling the fuel injector and air intake valve, programmed to maintain stoichiometric air-fuel ratio if the ethanol concentration is determined to be less than a threshold value, but to provide substantial excess air for lean combustion at higher efficiency if the ethanol concentration is not determined to be less than the threshold value;
    a three-way catalyst for cleaning exhaust from the combustion; and
    a lean NOx aftertreatment device to remove harmful emissions from combustion.

4. The system of claim 3, wherein the threshold value of the ethanol concentration is 70%.

5. A flex-fuel combustion and aftertreatment system, comprising:
    an engine;
    a fuel tank configured to hold a fuel for combustion in the engine;
    fuel injectors fluidly connected to the fuel tank, configured to provide the fuel for combustion in the engine;
    means for determining the sulfur concentration of the fuel;
    means for controlling the fuel injectors and an air intake valve, programmed to maintain stoichiometric air-fuel ratio if the sulfur concentration is determined to be greater than a threshold value, but to provide substantial excess air for lean combustion at higher efficiency if the sulfur concentration is not determined to be greater than the threshold value;
    a three-way catalyst for cleaning exhaust from the combustion; and
    a lean NOx aftertreatment device to remove harmful emissions from combustion.

* * * * *